US008056062B2

(12) United States Patent
Bowers et al.

(10) Patent No.: US 8,056,062 B2
(45) Date of Patent: Nov. 8, 2011

(54) METHODS AND SYSTEMS FOR CONVERTING APPLICATION CODE IN TURBINE CONTROL SYSTEMS

(75) Inventors: David Thomas Bowers, Salem, VA (US); Nagesh Laxminarayana Kurella, Roanoke, VA (US); Patrick Joseph Conroy, Roanoke, VA (US); Peter Frank Andrews, Salem, VA (US); Marc Gavin Lindenmuth, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 1062 days.

(21) Appl. No.: 11/748,407

(22) Filed: May 14, 2007

(65) Prior Publication Data

US 2008/0288928 A1 Nov. 20, 2008

(51) Int. Cl.
G06F 9/44 (2006.01)
(52) U.S. Cl. .......................................... 717/136
(58) Field of Classification Search .................... 717/136
See application file for complete search history.

(56) References Cited

U.S. PATENT DOCUMENTS

| | | | | |
|---|---|---|---|---|
| 6,389,385 | B1 * | 5/2002 | King | 703/27 |
| 2002/0029097 | A1 * | 3/2002 | Pionzio et al. | 700/286 |
| 2004/0010521 | A1 * | 1/2004 | Li et al. | 707/200 |
| 2004/0068716 | A1 * | 4/2004 | Stevens | 717/140 |
| 2006/0007466 | A1 * | 1/2006 | Ben-Yehuda et al. | 358/1.13 |
| 2006/0143598 | A1 * | 6/2006 | Zimmer et al. | 717/136 |
| 2007/0271553 | A1 * | 11/2007 | Higgins et al. | 717/136 |

OTHER PUBLICATIONS

Parsian et al., "Ada Translation Tools Development: Automitic Translation of Fortran to Ada", Jun. 30, 1988 Ada Letteres retrieved from http://delivery.acm.org/10.1145/60000/51637/p57-parsian. pdf?key1=51637&key2=8672888821&coll=DL&dl=ACM &CFID=111935301&CFTOKEN=38572468.*

* cited by examiner

*Primary Examiner* — Philip Wang
(74) *Attorney, Agent, or Firm* — Sutherland Asbill & Brennan LLP

(57) ABSTRACT

Embodiments of the invention are generally directed to systems and methods for converting application code in a turbine control system. According to one embodiment of the invention, a method for converting a turbine control system may be provided for. The method may include providing a first application code format including one or more elements, providing a second application code format including one or more elements, and identifying mappings of the one or more first application code format elements to the one or more second application code format elements. The method may further include retrieving a first control system application code written in the first application code format, and generating application data from the first control system application code based at least in part on the identified mappings. Additionally, the method may include converting the application data to a second control system application code written in the second application code format.

20 Claims, 5 Drawing Sheets

METHODS AND SYSTEMS FOR CONVERTING APPLICATION CODE IN TURBINE CONTROL SYSTEMS

TECHNICAL FIELD

The invention relates generally to turbine control systems, and more particularly relates to methods and systems for converting application code in turbine control systems.

BACKGROUND OF THE INVENTION

Industrial and power generation turbines have control systems that monitor and control their operation. These control systems typically include multiple microprocessors configured as main control processors running application code that implements the control system functions.

Older control systems may become outdated and need to be replaced or updated to allow implementing current control system capabilities, such as processing-intensive model-based controls, PID controls, and more powerful application tools. However, it is often preferable to update the control system so as to cause the least impact on the turbine operation. Furthermore, simple and quick upgrades are more cost-effective by requiring less labor, less downtime, and by providing quicker realization of the benefits generated by the upgraded control systems.

The existing legacy control system application code executing the control logic may be compiled in a data format different from that required to run on the upgraded control system hardware. Application code, for example, may be written in one of many programming languages, such as, for example, C, C++, C#, Java, Pascal, or Fortran, which is then compiled into machine language code executed by one or more microprocessors. Depending upon the generation or the origin of the control system for which the original application code was written, the data formats may vary. For example, fixed point, also referred to as integer, data formats were used in earlier processors because they require lower processing overhead, thus faster mathematical operations, than using a floating point data format. Furthermore, some earlier processors are not capable of performing floating point operations. As microprocessor speeds improve, the capabilities of performing operations on more complex data formats improve. Because performing operations on floating point data allows for calculations over a wider range of numbers while maintaining greater accuracies, it may be desirable to run control systems on processors capable of operating on floating point data. However, to the extent that at least some of the legacy application code functionality is still relevant in the upgraded control systems, manually reprogramming control system processors in the new data format may be inefficient and may introduce quality problems.

In one example, the Mark V turbine control system manufactured by General Electric ("GE") has achieved a large installed base during the many years of production. While the GE Mark V turbine control system remains a viable platform for existing owners who are using it today, its ability to accept some control upgrades is limited. As advanced control methods for turbines are developed, an upgrade path is needed for the existing GE Mark V turbine control systems to upgrade to either the GE Mark Ve or the GE Mark VIe control systems. One aspect of the upgrade path includes upgrading at least some of the existing legacy processors to newer, current microprocessors capable of handling more complex operations as required by the upgraded control system functionality. Accordingly, the upgraded processors are capable of operating on larger, more complex data formats, such as 32-bit, floating point data. However, the application code for the existing legacy GE Mark V turbine control system was written to be compiled and executed in 16-bit, fixed point format. Thus, the legacy application code written for fixed point processing requires re-writing so that it may be compiled and executed in floating point format to take full advantage of the upgraded system capabilities. Furthermore, the upgraded control system may include a new programming environment based in the C# programming language, an object-oriented programming language as part of Microsoft Corporation's .NET platform. Therefore, performing operations on the application code in the new environment may require the application code to be written in C#.

Thus, there is a desire for systems and methods that allow efficient control system upgrades, including providing for application code conversions to an upgraded control system programming standard.

BRIEF DESCRIPTION OF THE INVENTION

Embodiments of the invention can address some or all of the needs described above. Embodiments of the invention are generally directed to systems and methods for converting application code in a turbine control system. According to one embodiment of the invention, a method for modifying a turbine control system may be provided for. The method may include providing a first application code format including one or more elements. The method may also include providing a second application code format including one or more elements. The method may further include identifying mappings of the one or more first application code format elements to the one or more second application code format elements. The method may further include retrieving a first control system application code written in the first application code format. Further, the method may include generating application data from the first control system application code based at least in part on the identified mappings. Additionally, the method may include converting the application data to a second control system application code written in the second application code format.

According to another embodiment of the invention, a system for modifying a turbine control system may be provided for. The control system may include a translator. The translator may be configured to retrieve a first application code written in a first application code format. The translator may also be configured to retrieve mappings of one or more elements of the first application code format to one or more elements of a second application code format. The translator may further be configured to generate application data from the first application code based at least in part on the retrieved mappings. Additionally, the translator may be configured to convert the application data to a second application code written in the second application code format.

According to yet another embodiment of the invention, a method for converting software in a turbine control system may be provided for. The method may include providing a legacy application code format including one or more elements, and providing an upgraded application code format including one or more elements. The method may also include identifying translation mappings of the one or more legacy application code format elements to the one or more upgraded application code format elements. The method may also include retrieving a legacy application code written in the legacy application code format and including at least one legacy variable, at least one legacy control logic program, and at least one legacy IO configuration. Further, the method may include generating variable application data from the legacy variable or variables based at least in part on the translation mappings, generating control logic application data from the legacy control logic program or programs based at least in part on the translation mappings, and generating IO configuration application data from the legacy IO configuration or configurations based at least in part on the translation mappings. Additionally, the method may include converting the variable application data to at least one upgraded variable, converting the control logic application data to at least one upgraded control logic program, and converting the IO configuration application data to at least one upgraded IO configuration. The upgraded variable or variables, the upgraded control logic program or programs, and the upgraded IO configuration or configurations may together be an upgraded application code written in the upgraded application code format.

Other embodiments and aspects of the invention will become apparent from the following description taken in conjunction with the following drawings.

DETAILED DESCRIPTION OF THE INVENTION

Figure 1:
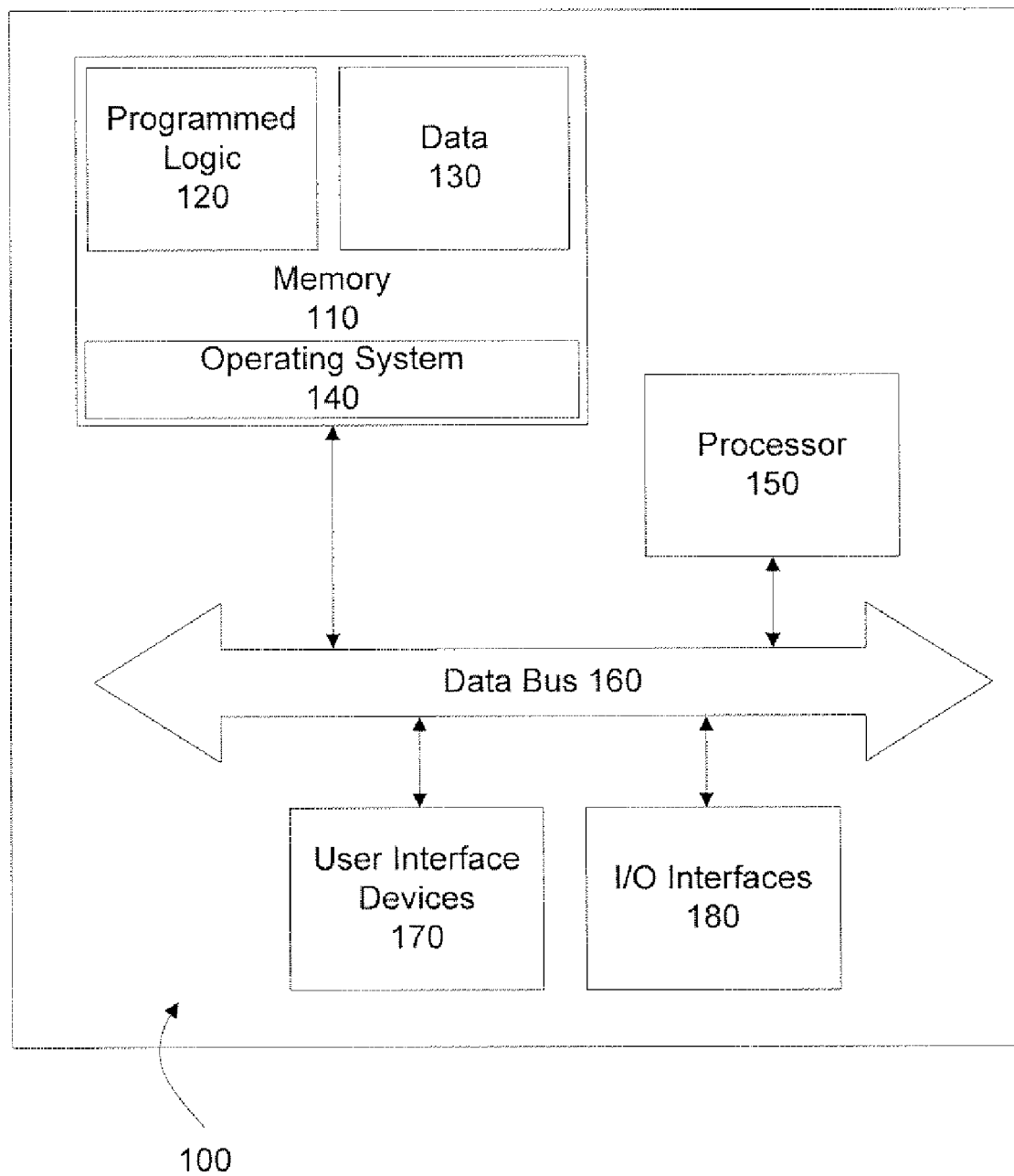
FIG. 1 is an example block diagram of a system used to implement various method embodiments of this application.

Embodiments of the invention now will be described more fully hereinafter with reference to the accompanying drawings, in which some, but not all embodiments are shown. Indeed, the subject matter of the present application may be embodied in many different forms and should not be construed as limited to the embodiments set forth herein; rather, these embodiments are provided so that this disclosure will satisfy applicable legal requirements. Like numbers refer to like elements throughout.

The application references block diagrams of systems, methods, apparatuses, and computer program products according to at least one embodiment described herein. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network. Example embodiments will hereinafter be described with reference to the figures, in which like numerals indicate like elements throughout the several drawings.

According to an embodiment of the invention, upgrading a turbine control system allows implementing current systems advances, such as, performance increasing tools, improved monitoring, more robust reporting, and more responsive and accurate control functions. During a control system upgrade, some components of the control system, for example, the main controller processor cards running application code that executes control logic and system functionality, may be upgraded. The example systems and methods described herein allow converting legacy application code executed by the legacy main controller processors to a format capable of execution by upgraded current main controllers. More specifically, a legacy control system may include one or more main controller processors that contain, for example, 16-bit microprocessors with processing capabilities limited to operating on 16-bit, fixed point data. It may be desirable to upgrade the main control processors to current microprocessors, for example, 32-bit microprocessors capable of performing operations on more complex, 32-bit, floating point data. Furthermore, upgraded control systems may include a programming and configuration environment configured to execute code written in a different language than that of the legacy application code. Accordingly, the embodiments of systems and methods described herein provide, for example, for converting the legacy application code executed by the legacy main controller processors to a current format capable of being executed by the upgraded current main controller processors. The conversion may be performed, in large part, by a computerized conversion tool, also referred to herein as a translator, that simplifies and automates at least some of the steps described herein. Control system upgrades may be performed in a more productive manner by using these example systems and methods by avoiding manually re-programming the legacy application codes to perform substantially similar functionality. More specifically, the functionality of the legacy application code logic may be retained by merely converting it to the new format capable of execution by the new processors and operation by the new control system tools. An automated application code conversion tool provided for by the embodiments of methods and systems described herein will further mitigate upgrade risks by reducing the application code bugs and defects that may result from manually re-programming the legacy application code.

FIG. 1 illustrates by way of a block diagram a translator 100 used to implement the application code conversion, according to an illustrative embodiment of the invention. More specifically, one or more of the translator 100 may carry out the execution of the application code conversion, such as, but not limited to, identifying application code components, extracting application code components, mapping application code to current application code counterparts, storing application data, converting legacy application code to current application code, configuring upgraded application code, saving the converted and configured application code, compiling the upgraded application code, and downloading the application code to control system hardware and/or software. The translator 100 may include a memory 110 that stores programmed logic 120, for example the software that performs at least some of the application code conversion steps described below, and may store data 130, such as application code source files, configuration files, data dictionaries, assignment files, relay ladder logic files, extracted application code, generated application data, or the like, as is known in the art. The memory 110 also may include an operating system 140. A processor 150 may utilize the operating system 140 to execute the programmed logic 120, and in doing so, also may utilize the data 130. A data bus 160 may provide communication between the memory 110 and the processor 150. Users may interface with the translator 100 via a user interface device(s) 170 such as a keyboard, mouse, control panel, or any other devices capable of communicating data to and from the translator 100. The translator 100 may be in communication with other turbine system components, such as a legacy control system, an upgraded control system, turbine sensor devices, or other systems on a network, via an I/O Interface 180.

In the illustrated embodiment, the translator 100 may be located remotely with respect to the control system; although, it may be co-located or even integrated with the control system. Further the translator 100 and the programmed logic 120 implemented thereby may include software, hardware, firmware, or any combination thereof. It should also be appreciated that multiple translators 100 may be used, whereby different features described herein may be executed on one or more different translators 100. In one example, the translator 100 may be two software tools—one for identifying legacy files, extracting legacy data and application code, and generating application data, as described below; and another for converting the application data to the upgraded programming language and further for configuring new application code and compiling application code for installation and execution by the control system hardware. However, for simplicity, the translator 100 will be referred to as a single component, though it is appreciated that it may be more than one computer station and/or more than one software application directed to different functions.

Figure 2:
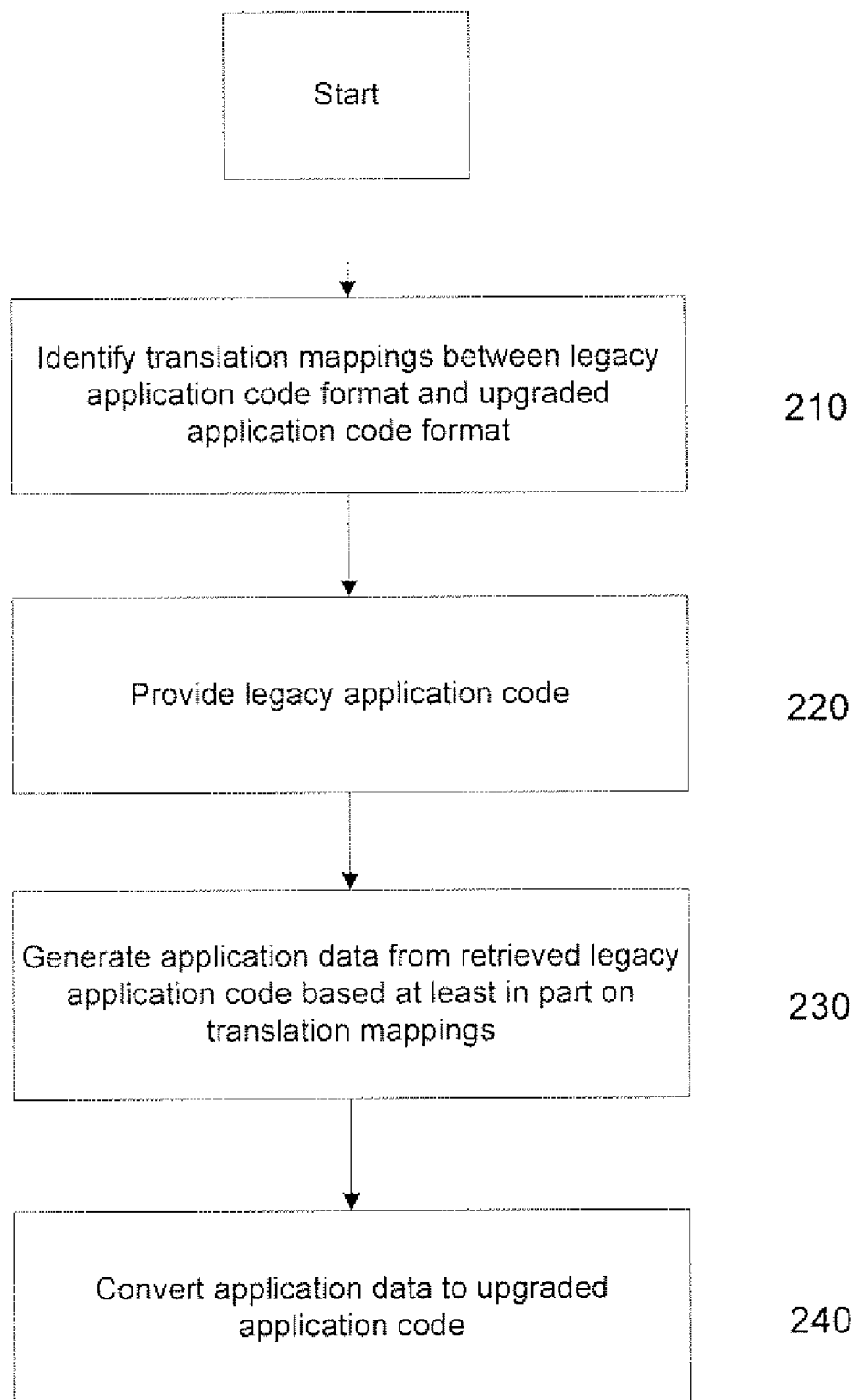
FIG. 2 is an example flowchart illustrating a method for converting application code of a control system according to an embodiment of this invention.

FIG. 2 illustrates an example method by which an embodiment of the invention may operate. Provided is an example flowchart of the basic operation of an application code conversion method, at least partially executed by the translator 100, for converting legacy application code to upgraded, current application code, according to an illustrative embodiment of the invention. The legacy control system application code may include, for example, variable information, control logic, and/or IO configuration information.

Variable information may define one or more data elements stored or referenced by each variable, as is known in the art. The variable information may include the data type, such as constant, fixed point, or Boolean (or logic) data types. If the information is a constant, the variable information may indicate the value of that constant. The variable information may also include scaling information to provide proper translation for operation on by the control system and display to a user. The variable information may also include the unit information in which the data stored or referenced is measured, such as Celsius, mmHg, p.s.i., %, Amps, etc. Also, the variable information may include information indicating lower limits and upper limits for values stored in the variable as well as precision of the data stored in the variables. Additionally, variable information may include the scope of the variable, for example, whether it has global scope or local scope within the control logic program, as is known in the art.

For example, in a GE Mark V control system, the variables may be referred to as signals and points. A signal may be used to store or reference inputs and outputs to the control logic program functions and may be used to store data or constant values. A point may be used to store or reference data received by the turbine sensor devices performing measurements on the turbine or related hardware during operation and transmitted to the control system. A point may be logically correlated to IO terminations on a terminal board of the control system. Furthermore, in the GE Mark V control system, the variable information may be stored in one or more of the data dictionary files (having a ".dat" extension), assignment files (having a ".asg" extension), and/or source files (having a ".src" extension). However, it is appreciated that the above descriptions of possible variable types, definitions, and file locations are given as examples only, and that other variable definitions as used in control systems may be operated on and converted by the methods and systems described herein.

The application code may further include control logic, which implements the functionality and logic of the control system to monitor and control the turbine by performing operations on data typically stored in the variables described above. The control logic may be implemented as one or more computer programs written in a traditional programming language, such as, for example, C, C++, or C#, as is known in the art. For example, the control logic includes functions, routines, and/or subroutines performing operations on variables and/or calling other functions. In the example of the GE Mark V control system, the application code may be written in C or C++ and stored as one or more control sequence programs having one or more program segments. The program segments in the GE Mark V may receive one or more signals as inputs and generate outputs that may be in the form of a signal or executing a call to another program segment. Further, in the GE Mark V control system, the control logic may be stored in one or more source files (having an ".src" extension), one or more configuration files (having an ".cfg" extension), and/or one or more relay ladder logic files (having an ".rld" extension).

The application code may further include control system IO configuration information. The IO configuration information describes the logical correlation between the physical input and output terminations sending and receiving signals to and from the control system and the variables as described above. For example, the IO configuration information relates a variable to a termination configured to receive a signal from a turbine monitoring device. Furthermore, the IO configuration stores information about the termination configuration of the input and output terminations terminating on terminal boards of the control system. For example, the GE Mark V includes IO configuration information in one or more files, such as data dictionary files (having a ".dat" extension), list files (having an ".lst" extension), parameter files (having a ".prm" extension), and/or assignment files (having an ".asg" extension).

At block 210, a translation mapping of the individual legacy application code component types, as defined by the legacy application code format or syntax, to their corresponding counterparts in the upgraded control system format is identified. More specifically, one or more translation mappings are created relating each legacy variable type to a corresponding upgraded variable type, relating each control logic function to a corresponding upgraded current control logic function, and relating each IO configuration parameter to corresponding IO configuration parameters in the upgraded current control system. It is appreciated that there may not be exact corresponding counterparts for every individual element type in each of the variables, control logic, and IO configuration. For those elements that do not have corresponding counterparts, mapping may not be performed. Alternatively, mapping may be performed to a best fit counterpart in the upgraded control system. In another alternative, legacy application code elements, for example, certain variable types or certain control logic functions, without counterparts may be mapped to a default location for rectifying either at a later point during the application code conversion, or not at all.

The translation mapping performed at block 210 may be performed manually by a human, designating translation mappings that identify the relationships between the legacy and upgraded elements. Further, the translation mapping step at block 210 may be performed once, before the translator 100 is executed to translate code from a first format to a second format. It may be done immediately prior to executing the remaining application code conversion steps, or it may be done as a design or configuration step when configuring the translator 100 software for the specific control system conversion task, as described herein. For example, the translation mapping may only be performed once for any conversions between a GE Mark V control system to a GE Mark Ve control system. However, in this example, another translation mapping would be performed at block 210 if the control system was being upgraded from a GE Mark IV control system to a GE Mark Ve control system.

At block 220, application code from a legacy control system is retrieved. It is appreciated that the application code retrieved may include some or all of the components described above, such as variables, control logic, and/or IO configuration information. Further, the conversion process may be performed on only one or a few of the application code components in alternative embodiments of the methods and systems described herein, and more fully described in reference to FIGS. 3-5. The application code may be retrieved at block 220 automatically, based at least in part on a predefined instructions of the translator 100, or may be retrieved manually by the user identifying which elements of the application code to convert. The application code retrieved at block 200 may be in text format, such as an ASCII text file, as is known in the art.

At block 230, the one or more legacy application code elements retrieved at block 220 are operated on, based at least in part on the translation mappings identified at block 210, to generate application data. The application data may include information and/or data retrieved from the legacy application code that is mapped into correlating application code elements from the upgraded control system application code. In one embodiment of the invention, the application data may be stored in one or more markup language files, such as an XML file, to be read by the translator 100 and converted in subsequent steps, as described below.

At block 240, the translator 100 may convert the application data, as generated at block 230, into upgraded application code in conformity with the programming language format of the upgraded control system. More specifically, the translator 100 may automatically format the application data, which is already mapped and thus associated to upgraded application code elements (in blocks 210 and 230), to the programming language executed by the upgraded control system. For example, when upgrading the GE Mark V control system to the GE Mark Ve or GE Mark VIe control system, the application data is converted to application code written in the C# programming language. The conversion is based, at least in part, on the information stored in the application data. For example, when converting variable application data, the translator 100 defines the upgraded variables, based on the type, scale, and unit information stored in the application data. Similarly, for example, when converting the control logic application data, the translator 100 creates proper program logic steps, based on the designation of legacy logic steps, and their interrelation, as stored in the application data.

Figure 4:
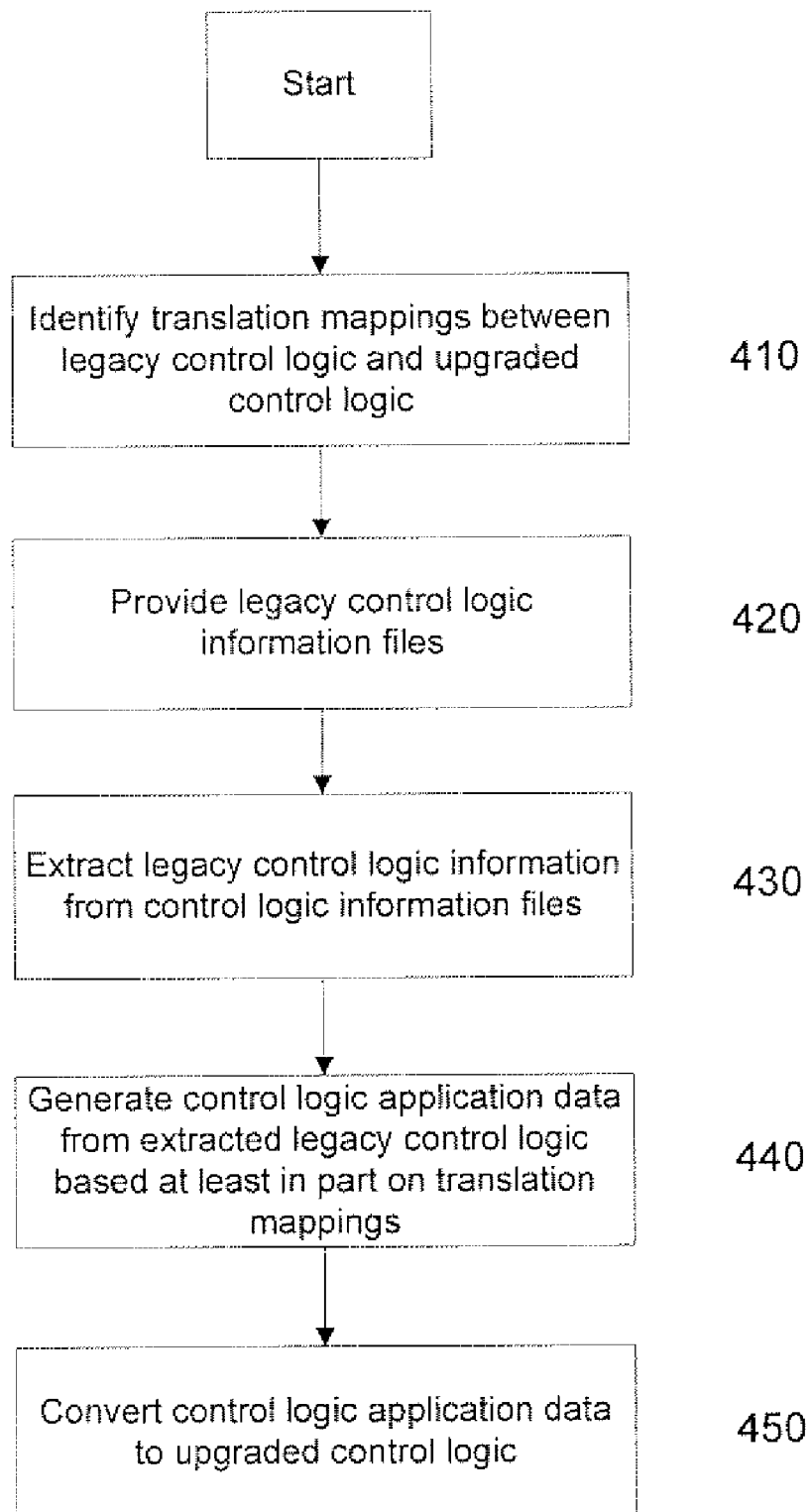
FIG. 4 is an example flowchart illustrating a method for converting application code control logic of a control system according to an embodiment of this invention.
Figure 5:
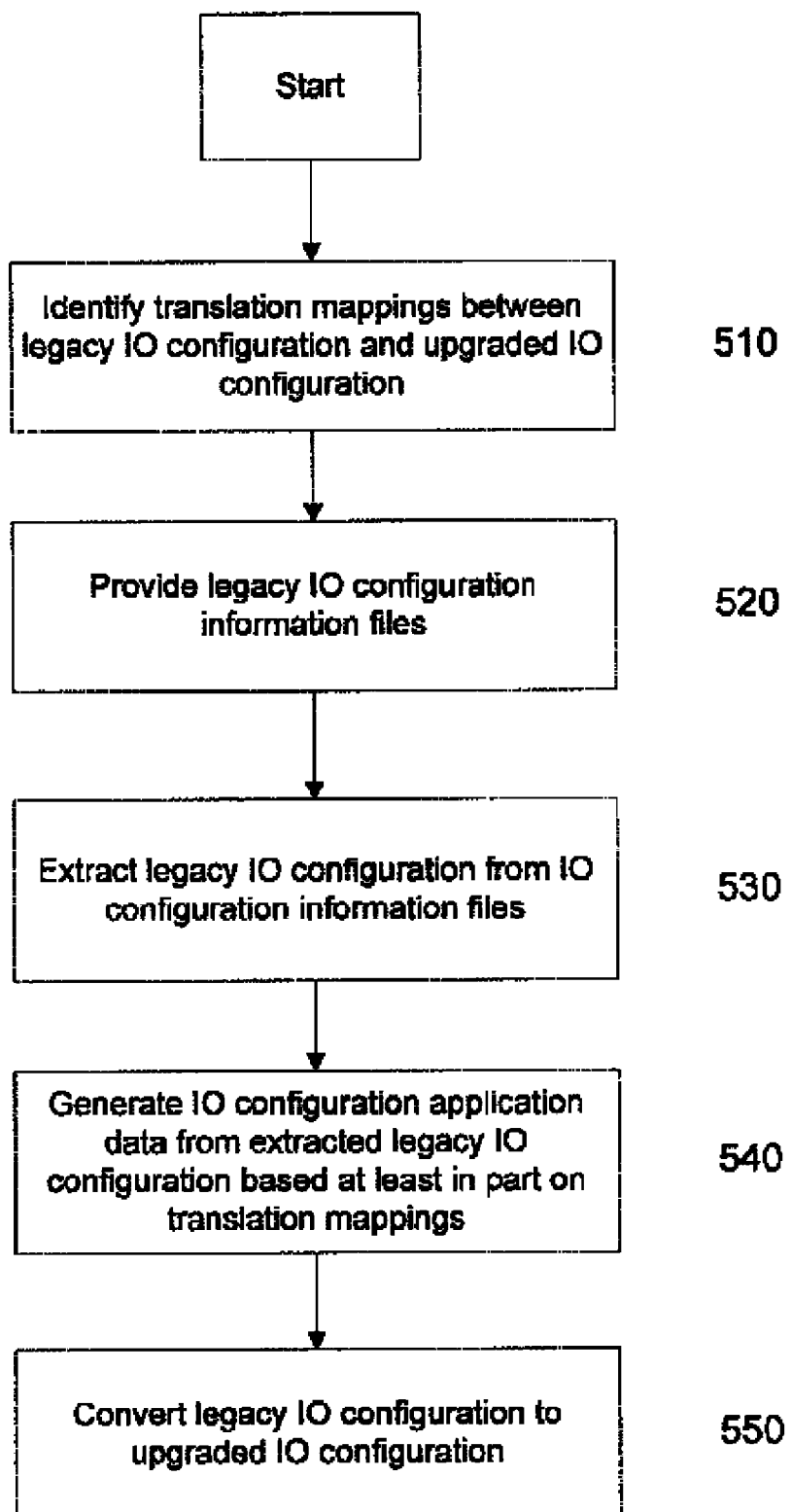
FIG. 5 is an example flowchart illustrating a method for converting application code IO configuration of a control system according to an embodiment of this invention.

The above description of the elements illustrated in FIG. 2 is intended to provide an example of the elements that may be executed by embodiments of the invention. The following description of FIGS. 3-5, provides more detailed descriptions of other embodiments of the invention, including at least some of the steps described above in reference to FIG. 2.

Figure 3:
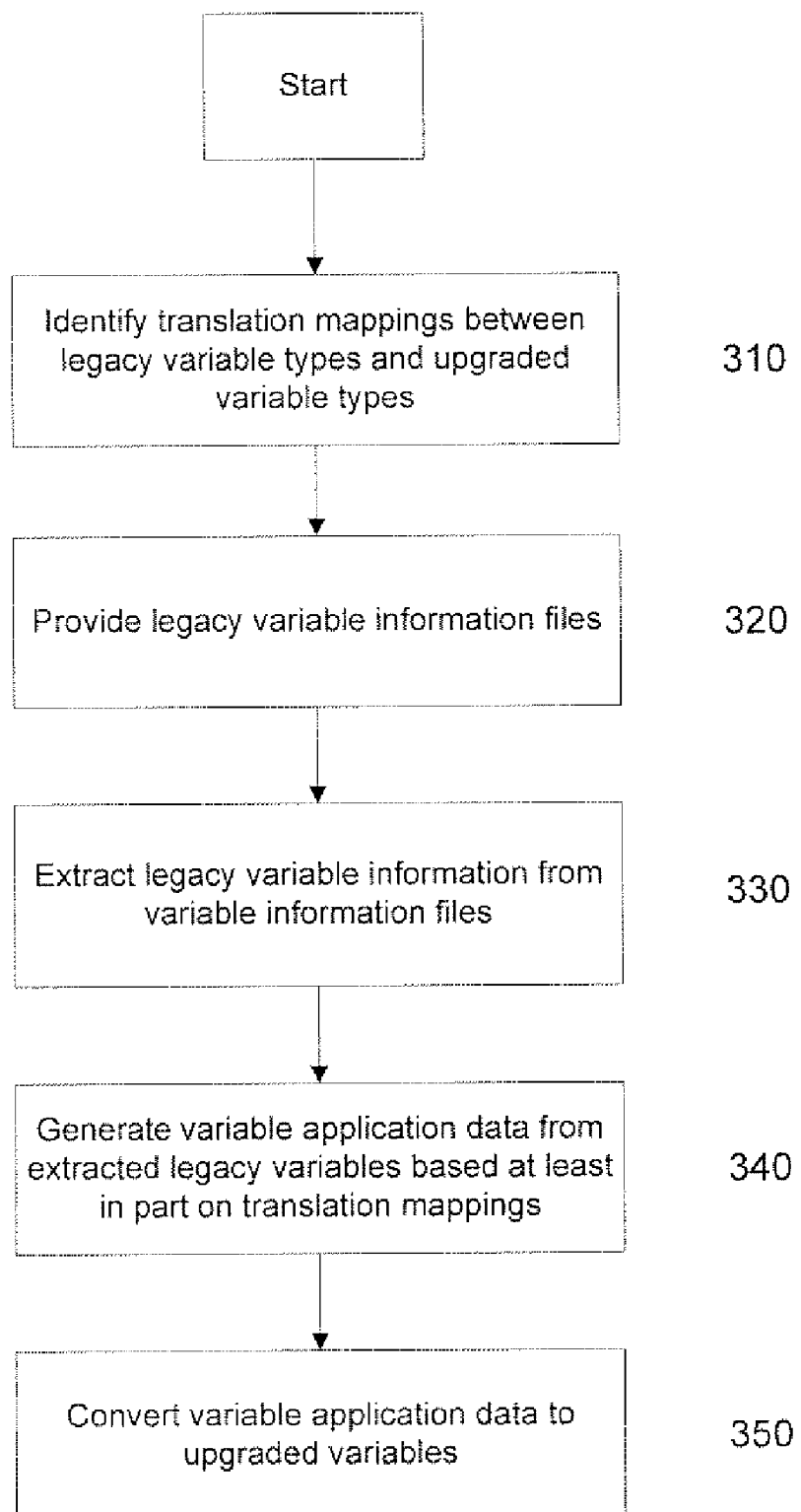
FIG. 3 is an example flowchart illustrating a method for converting application code variables of a control system according to an embodiment of this invention.

FIG. 3 provides a detailed illustration of an example method by which an embodiment of the invention may operate. More specifically, FIG. 3 provides example steps for converting legacy application code variables to upgraded application code variables. It is appreciated that the steps as illustrated by FIG. 3 may be performed independently in an embodiment of the invention or may be performed in concert with one or more of the other FIGS. 2 and 4-5. Further, it is appreciated that FIG. 3, when considered in light of FIG. 2, provides further details of at least some of the steps that may be carried out by the methods illustrated by FIG. 2.

At block 310, the translation mappings designating the relationship between legacy application code variable types and definitions and their upgraded application code counterparts are identified, as discussed above in reference to FIG. 2. In one example, when upgrading a GE Mark V control system to a CE Mark Ve or GE Mark VIe control system, the variables in the GE Mark V control system are referred to as signals and points (described above in reference to FIG. 2), and the variables in the upgraded GE Mark Ve or GE Mark VIe control system are simply referred to as variables. Accordingly, all legacy signals and points in the legacy application code may be related to corresponding variable types in the upgraded application code by the translation mappings. Additionally, as described above, for instances where certain legacy variables do not map to upgraded variables, they may be ignored, mapped to the best-fit upgraded variables, and/or preserved for manual handling after the automatic conversion and before compiling the code for install on the hardware. Again, as described above, the translation mappings only need to be identified a single time for each type of control system upgrade. It may be considered that the step illustrated at block 310 is a preparation step and need not be performed each time an embodiment of the invention is practiced.

At block 320, the appropriate application code file or files housing legacy variable information are provided. More specifically, in one embodiment, after selecting which legacy control system is going to be upgraded, the translator 100 automatically selects the appropriate files that contain the information defining the legacy variables and store data related to the legacy variables. In an alternate embodiment, the translator 100 is operated by a user who selects one or more files of the legacy application code. In a specific example of upgrading the GE Mark V control system, after selecting the specific GE Mark V control system to upgrade, the assignment files, the configuration files, and/or the data dictionary flies are provided. These files may be operated on in one or more steps described below. Furthermore, in one embodiment, the provided variable files may be validated for their completeness. More specifically, the translator 100 may validate the existence of the legacy variable files and folders that are required to recreate the variable configuration in the upgraded application code. For instance, this may include validating that the assignment files, the configuration files, and the data dictionary files were provided at block 320.

At block 330, the information from the variable files provided at block 320 is automatically extracted by the translator 100. The variable information may be stored in memory as ASCII text, as described above. In the specific example upgrading the GE Mark V control system to the GE Mark Ve or GE Mark VIe control system, each definition of each signal, including its scale, type, and unit information may be extracted, as well as data values, such as constants, stored with the signals. Similarly, each definition of each point, including its scale, type, unit, and any constant data values may be extracted.

At block 340, the translator 100 automatically generates variable application data from the extracted variable information retrieved at block 330. More specifically, the extracted variable information, which may be stored as ASCII text files, may be parsed by the translator 100, using, at least partially, the translation mappings identified at block 310, so as to allow relating them to the correlated upgraded variables. For example, the translator 100 parses the ASCII text file or files into one or more XML files having a format that may be operated on by the translator 100 for conversion to the upgraded application code format for further configuration and/or compiling. In one embodiment, the variable application data may be stored in a memory in the translator 100 for retrieval and subsequent processing.

At block 350, the translator 100 automatically converts the variable application data into an application code variable format that may be executed by the upgraded control system. For example, when converting from the GE Mark V to the GE Mark Ve or GE Mark VIe control system, the translator 100 automatically converts the variable application data stored in XML form into variable format as required by the C# programming language standards. It is appreciated that the translator 100 may be configured to convert XML files into other programming languages.

FIG. 4 provides a detailed illustration of an example method by which an embodiment of the invention may operate. More specifically, FIG. 4 provides example steps for converting legacy application code control logic to upgraded application code control logic. It is appreciated that the steps as illustrated by FIG. 4 may be performed independently in an embodiment of the invention or may be performed in concert with one or more of the other FIGS. 2-3 and 5. Further, it is appreciated that FIG. 4, when considered in light of FIG. 2, provides further details of at least some of the steps that may be carried out by the methods illustrated by FIG. 2.

At block 410, the translation mappings designating the relationship between legacy application code control logic functions and its upgraded application code counterparts are identified, as discussed above in reference to FIG. 2. In one example, when upgrading a GE Mark V control system to a GE Mark Ve or GE Mark VIe control system, the control logic in the GE Mark V control system may include one or more control sequence programs containing one or more program segments (described above in reference to FIG. 2), and the control logic in the upgraded GE Mark Ve or GE Mark VIe control system includes one or more blocks performing discrete control logic functions. More specifically, the GE Mark Ve or GE Mark VIe blocks may have certain types, such as primitive blocks, big blocks, or rung blocks, as are known in the art. Additionally, the blocks may be connected to each other to further define the control logic functionality. Accordingly, the legacy control sequence programs and program segments types in the legacy application code may be related to corresponding block types in the upgraded application code by the translation mappings identified at block 410. In the example upgrading to the GE Mark Ve or GE Mark VIe control system, the program segments having keywords "#prim" and "#bbl" would be mapped to the correlating "primitive" and "big block" blocks, respectively, and the program segments not having a keyword may be mapped to "Boolean engineering" blocks in the upgraded application code control logic. Further, the translation mappings may also identify that certain keywords may indicate comments embedded in the control logic code. Additionally, as described above, for instances where certain legacy control logic functions do not map to upgraded control logic functions, they may be ignored, mapped to the best-fit upgraded control logic function, and/or preserved for manual handling after the automatic conversion and before compiling the code for install on the hardware. Again, as described above, the translation mappings only need to be identified a single time for each type of control system upgrade. It may be considered that the step illustrated at block 410 is a preparation step and need not be performed each time an embodiment of the invention is practiced.

At block 420, the appropriate application code file or files housing legacy control logic information are provided. This step may be executed similar to that described at block 320 in reference to FIG. 3 above, excepting that the application code files provided are those housing the legacy control logic information instead of the legacy variable information. In the specific example of upgrading the GE Mark V control system, the source files, configuration files, and/or relay ladder logic files may be provided. Additionally, the provided control logic files may be validated for their completeness.

At block 430, the information from the control logic files provided at block 420 may be automatically extracted by the translator 100. This step may be executed similar to that described at block 330 in reference to FIG. 3 above, excepting that the application code files extracted are those housing the legacy control logic information instead of the legacy variable information. In the specific example upgrading the GE Mark V control system, each control sequence program and program segment may be extracted.

At block 440, the translator 100 automatically generates control logic application data from the extracted variable information retrieved at block 430. More specifically, the extracted control logic, which may be stored as ASCII text files, may be parsed by the translator 100, using at least partially, the translation mappings identified at block 410, so as to allow converting it to upgraded control logic code. For example, the translator 100 parses the ASCII text file into one or more XML files having a format that may be operated on by the translator 100 for conversion to the upgraded application code format for further configuration and/or compiling. In one embodiment, the control logic application data may be stored in a memory in the translator 100 for retrieval and subsequent processing.

At block 450, the translator 100 automatically converts the control logic application data into upgraded application code control logic that may be executed by the upgraded control system. For example, when converting from the GE Mark V to the GE Mark Ve or GE Mark VIe control system, the translator 100 automatically converts the control logic application data stored in XML form into control logic format as required by the C# programming language standards. More specifically, a first XML application data element representing, for example, a legacy program segment, may be converted to the correlating upgraded control logic block, as identified in the translation mappings, written in C#. A second XML application data element representing a different legacy program segment may also be converted to the correlated upgraded control logic block, written in C#. Further, to the extent that the two legacy program segments were connected, as may be identified by corresponding input and output signal names (an input of one segment would be connected to another segment having the same output), the converted control logic blocks may be similarly connected. Furthermore, it is appreciated that any number of relationships, such as one to one, one to many, and many to many, may exist between the upgraded control logic blocks. It is also appreciated that the translator 100 may be configured to convert XML files into other programming languages, for example from C to C++.

FIG. 5 provides a detailed illustration of an example method by which an embodiment of the invention may operate. More specifically, FIG. 5 provides example steps for converting legacy IO configuration to upgraded IO configuration. It is appreciated that the steps as illustrated by FIG. 5 may be performed independently in an embodiment of the invention or may be performed in concert with one or more of the other FIGS. 2-4. Further, it is appreciated that FIG. 5, when considered in light of FIG. 2, provides further details of at least some of the steps that may be carried out by the methods illustrated by FIG. 2.

At block 510, the translation mappings designating the relationship between legacy IO configuration parameters and its upgraded IO configuration counterparts are identified, as discussed above in reference to FIG. 2. Accordingly, legacy IO configurations, including the logical correlation between the physical input and output terminations and the variables as described above, and the terminations on the terminal boards of the control system, may be related to corresponding IO configurations in the upgraded application code by the translation mappings identified at block 510. And finally, as described above, for instances where certain IO configurations do not map to upgraded IO configurations, they may be ignored, mapped to the best-fit IO configurations, and/or preserved for manual handling after the automatic conversion and before compiling the code for install on the hardware. Again, as described above, the translation mappings only need to be identified a single time for each type of control system upgrade. It may be considered that the step illustrated at block 510 is a preparation step and need not be performed each time an embodiment of the invention is practiced.

At block 520, the appropriate IO configuration file or files housing legacy IO configuration information are provided. This step may be executed similar to that described at block 320 in reference to FIG. 3 above, excepting that the files provided are those housing the IO configuration information instead of the legacy variable information. In the specific example of upgrading the GE Mark V control system, the dictionary files, the list files, the parameter files, and/or the assignment files may be provided. Additionally, the provided IO configuration information files may be validated for their completeness.

At block 530, the information from the control logic files provided at block 520 is automatically extracted by the translator 100. This step may be executed similar to that described at block 330 in reference to FIG. 3 above, excepting that the IO configuration files extracted are those housing the legacy IO configuration information instead of the legacy variable information. In the specific example upgrading the GE Mark V control system, each IO configuration and IO mapping may be extracted.

At block 540, the translator 100 automatically generates IO configuration application data from the extracted variable information retrieved at block 530. More specifically, the extracted IO configuration, which may be stored as ASCII text files, may be parsed by the translator 100, using at least partially, the translation mappings identified at block 510, so as to allow converting the configuration to upgraded IO configuration. For example, the translator 100 parses the ASCII text file into one or more XML files having a format that may be operated on by the translator 100 for conversion to the upgraded format for further configuration and/or compiling. In one embodiment, the IO configuration application data may be stored in a memory in the translator 100 for retrieval and subsequent processing.

At block 550, the translator 100 automatically converts the IO configuration application data into upgraded IO configuration that may be executed by the upgraded control system. For example, when converting from the GE Mark V to the GE Mark Ve or GE Mark VIe control system, the translator 100 automatically converts the IO configuration application data stored in XML form into IO configuration format as required by the C# programming language standards.

It is appreciated that after converting the components of the application code to the upgraded programming language format, that the code may then be further configured or modified through ordinary control system configuration tools, as are known in the art. Furthermore, to the extent that some components of the application code either failed during the automatic conversion process, or were preserved because of a lack of having a correlating upgraded component, as described above, ordinary control system configuration tools may be utilized to modify the failed legacy application code elements, or to write new, replacement application code to the extent the functionality is desired. It is further appreciated that ordinary control system configuration tools may be used to compile the converted application code into machine language or hardware specific language for installation on and operation by the upgraded control system hardware components, such as main controllers and IO processors. Furthermore, it is appreciated that the step compiling the upgraded C# application code into the machine specific language is the step that effectively converts the application code into a 32-bit, floating point format as used by the upgraded processors.

Accordingly, providing methods and systems to automatically convert application code from a legacy format to a new format, such as from C or C++ to C#, that may then be compiled into a 32-bit, floating point format reduces the inherent risks of manually reprogramming application code functionality when upgrading control systems, further improves the upgrade process, and reduces the time during which the turbines are offline.

Many modifications and other embodiments of the example descriptions set forth herein will come to mind to one skilled in the art to which these descriptions pertain having the benefit of the teachings presented in the foregoing descriptions and the associated drawings. Thus, it will be appreciated by those of ordinary skill in the art that the subject matter of this application may be embodied in many forms and should not be limited to the embodiments described above. Therefore, it is to be understood that the application is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for modifying a turbine control system, the method comprising:
    providing a first application code format comprising one or more elements;
    providing a second application code format comprising one or more elements;
    identifying mappings of said one or more elements of said first application code format to said one or more elements of said second application code format;
    retrieving a first turbine control system application code comprising said first application code format, wherein the first turbine control system application code comprises turbine system control logic or turbine control system input-output (IO) configuration information;
    generating application data from said first turbine control system application code based at least in part on said identified mappings, wherein the application data is stored as one or more ASCII text files and parsed into one or more XML files prior to conversion; and
    converting said application data to a second turbine control system application code comprising said second application code format, wherein the second turbine control system application code comprises translated turbine system control logic or translated turbine system control input-output (IO) configuration information.

2. The method of claim 1, wherein said first turbine control system application code comprises at least one of the following: at least one variable, at least one control logic program, or at least one IO configuration; and
    wherein said second turbine control system application code comprises at least one of the following: at least one variable, at least one control logic program, or at least one IO configuration.

3. The method of claim 1, wherein said generating application data from said first turbine control system application code and said converting application data to said second turbine control system application code are performed at least in part automatically by a translator.

4. The method of claim 1, wherein said first application code format comprises one of the following: C or C++.

5. The method of claim 1, wherein said second application code format comprises one of the following: C++ or C#.

6. The method of claim 1, wherein said generating application data from said first turbine control system application code further comprises formatting said generated application data as at least one markup language file.

7. The method of claim 1, wherein said first turbine control system application code comprises at least one file; and the method further comprises extracting said first control system application code from said at least one file, wherein said application data is generated from said at least one file.

8. The method of claim 7, wherein said extracting said first turbine control system application code further comprises formatting said extracted first turbine control system application code as at least one text file.

9. A system for modifying a turbine control system, comprising:
    a translator configured to:
        retrieve a first application code comprising a first application code format wherein the first application code comprises turbine control logic or turbine control system input-output (IO) configuration information;
        retrieve mappings of one or more elements of said first application code format to one or more elements of a second application code format;
        generate application data from said first application code based at least in part on said retrieved mappings, wherein the application data is stored as one or more ASCII text files and parsed into one or more XML files prior to conversion; and
        convert said application data to a second application code comprising said second application code format, wherein the second application code comprises translated turbine control logic or translated turbine control system input-output (IO) configuration information.

10. The system of claim 9, wherein said first application code comprises at least one of the following: at least one variable, at least one control logic program, or at least one IO configuration; and
    wherein said second application code comprises at least one of the following: at least one variable, at least one control logic program, or at least one IO configuration.

11. The system of claim 9, wherein said first application code format comprises one of the following: C or C++.

12. The system of claim 9, wherein said second application code format comprises one of the following: C++ or C#.

13. The system of claim 9, wherein said translator is further configured to format said generated application data as at least one markup language file.

14. The system of claim 9, wherein said first application code comprises at least one file;
    wherein said translator is further configured to extract said first application code from said at least one file; and
    wherein said application data is generated from said at least one file.

15. The system of claim 14, wherein said translator is further configured to format said extracted first application code as at least one text file.

16. A method for converting software in a turbine control system, comprising:
    providing a legacy application code format comprising one or more elements;
    providing an upgraded application code format comprising one or more elements;
    identifying translation mappings of said one or more elements of said legacy application code format to said one or more elements of said upgraded application code format;
    retrieving a legacy turbine control system application code written in said legacy application code format and comprising at least one legacy turbine control system variable, at least one legacy turbine control system logic program, and at least one legacy turbine control system IO configuration;

generating variable turbine control system application data from said at least one legacy turbine control system variable based at least in part on said translation mappings;

generating turbine control system logic application data from said at least one legacy turbine control system logic program based at least in part on said translation mappings;

generating turbine control system IO configuration application data from said at least one legacy turbine control system IO configuration based at least in part on said translation mappings;

wherein one or more of the variable turbine control system application data, the turbine control system logic application data, and the turbine control system IO configuration application data is stored as one or more ASCII text files and parsed into one or more XML files prior to conversion;

converting said variable turbine control system application data to at least one upgraded turbine control system variable;

converting said turbine control system logic application data to at least one upgraded turbine control system logic program; and converting said turbine control system IO configuration application data to at least one upgraded turbine control system IO configuration;

wherein said at least one upgraded turbine control system variable, at least one upgraded turbine control system logic program, and at least one upgraded turbine control system IO configuration comprise an upgraded turbine control system application code written in said upgraded application code format.

17. The method of claim 16, wherein said at least one legacy turbine control system variable comprises at least one of the following: at least one signal or at least one point;

wherein said translation mappings map said at least one signal to a first upgraded turbine control system variable; and wherein said translation mappings map said at least one point to a second upgraded turbine control system variable.

18. The method of claim 16, wherein said at least one legacy turbine control system logic program comprises at least one program segment;

wherein said at least one upgraded turbine control system logic program comprises at least one block; and wherein said translation mappings map said at least one program segment to said at least one block.

19. The method of claim 16, wherein said legacy turbine control system application code format comprises one of the following: C or C++; and wherein said upgraded turbine control system application code format comprises one of the following: C++ or C#.

20. The method of claim 16, wherein said legacy turbine control system application code is associated with a legacy turbine control system; and wherein said upgraded turbine control system application code is associated with a current turbine control system.

* * * * *